United States Patent
Eriksson et al.

(10) Patent No.: US 6,647,414 B1
(45) Date of Patent: Nov. 11, 2003

(54) METHOD FOR AUTOMATIC INFORMATION TRANSMISSION IN AN IP NETWORK

(75) Inventors: Mats Eriksson, Årsta (SE); Christer Boberg, Västerhaninge (SE); Thommy Eklöf, Ingarö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/383,170

(22) Filed: Aug. 25, 1999

(30) Foreign Application Priority Data

Aug. 26, 1998 (SE) ................................. 9802856

(51) Int. Cl.⁷ ................ G06F 15/173; G06F 15/16; G06F 17/60
(52) U.S. Cl. ............... 709/224; 709/227; 709/229; 709/217; 709/218; 709/219; 705/14
(58) Field of Search ............... 709/224, 227, 709/229, 217, 218, 219; 705/14

(56) References Cited

U.S. PATENT DOCUMENTS

| | | | |
|---|---|---|---|
| 5,572,643 A | | 11/1996 | Judson ................ 395/793 |
| 5,740,549 A | | 4/1998 | Reilly et al. ............ 705/14 |
| 5,898,839 A | * | 4/1999 | Berteau .............. 395/200.57 |
| 6,009,409 A | * | 12/1999 | Adler et al. ............ 705/14 |
| 6,088,451 A | * | 7/2000 | He et al. .............. 380/25 |
| 6,108,786 A | * | 8/2000 | Knowlson ............. 713/200 |
| 6,205,551 B1 | * | 3/2001 | Grosse ................ 713/201 |
| 6,393,421 B1 | * | 5/2002 | Paglin ................. 707/9 |
| 2002/0062217 A1 | * | 5/2002 | Fujimori ............... 705/1 |

FOREIGN PATENT DOCUMENTS

| | | | |
|---|---|---|---|
| EP | 0 877 314 | 11/1998 | ............. G06F/3/14 |
| EP | 0877314 | * 11/1998 | ............. G06F/3/14 |
| WO | 96/14706 | 5/1996 | ............. H04M/15/00 |
| WO | 96/24213 | 8/1996 | ............. H04L/29/06 |
| WO | WO-97/27531 | * 1/1997 | ............. G06F/3/14 |
| WO | 97/12486 | 4/1997 | ............. H04N/7/16 |
| WO | 97/13329 | 4/1997 | |
| WO | 97/13352 | 4/1997 | ............. H04M/3/50 |
| WO | 97/26729 | 7/1997 | |
| WO | 97/27531 | 7/1997 | ............. G06F/3/14 |

OTHER PUBLICATIONS

"Word of Mouse", *The Enconomist*, May 2, 1998.

* cited by examiner

*Primary Examiner*—Glenton B. Burgess
*Assistant Examiner*—Marlon Johnson

(57) ABSTRACT

The reliability of a data flow between a server and a client in a data communications network is increased. An application in a user terminal is arranged to receive information from a server, such as a push server or a streaming server, in the network. A user who should have an active connection to the server is monitored to determine if the user currently has such a connection. An appropriate action is taken if this is not the case. The user's connection to the data communications network is monitored. If connected to the data communications network, the user should also have an active connection to said server.

23 Claims, 2 Drawing Sheets

METHOD FOR AUTOMATIC INFORMATION TRANSMISSION IN AN IP NETWORK

TECHNICAL FIELD

The present invention relates to Internet Protocol (IP) network connections in general and, more specifically, to communication between nodes in such networks.

BACKGROUND

Internet Protocol (IP) networks, the Internet being the obvious example, information can be retrieved from servers by client applications. Typically, the client application is found in a personal computer and used by a user to download and, in some cases, to supply information.

The price of Internet software packages has dropped over the last couple of years. The subscription cost and the cost of being connected to the Internet is, however, still relatively high, especially if connected through the telephone line. One way of cutting the subscribers' costs for the connection to the Internet would be to reduce the price if they would accept advertisements to be transmitted to them while connected.

Currently the most common way of providing advertisements on the Internet is to include them in the form of so called banners in web pages. When a user downloads a web page, in addition to the desired information, one or more banners comprising advertisements may be included. This solution only works with World Wide Web applications, that is, not while the user is, for example, working with an e-mail tool. Also, new advertisements can only be supplied when the user is actively retrieving information. It also allows very little adaptation to particular user profiles, etc.

Also, there is no connection to a particular user's use of the Internet, or to the services of a particular service provider. Rather, a content provider includes the advertisements in his own web pages, and the service provider does not make any money from it.

U.S. Pat. No. 5,572,643 describes a method by which a service provider may provide advertisements, or other information, to Internet users while they are searching for other information.

According to U.S. Pat No. 5,572,643, the advertisements are displayed on the user's terminal while it is waiting for other information, requested by the user, to be downloaded. The advertisements were downloaded to the user's terminal together with other information, as hidden information, for example with a web page that was downloaded earlier, and are displayed to the user when a new web page is being downloaded. This means that advertisements can only be supplied while the user is actively retrieving other information. Also, they are only displayed while the user is waiting for other information.

U.S. Pat. No. 5,740,549 describes a method of automatically distributing information such as advertisements to user terminals in a data network. An application in the user terminal, commonly referred to as a push client, at certain intervals, receives information from an information server, commonly referred to as a push server. This information is received at the terminal together with the information retrieved by the user from the Internet, and is presented to the user, for example, when the terminal is idle.

Most push clients allow the user to specify the push servers from which information should be received. Therefore, there is a risk of users disabling the reception of information from the push servers while still keeping the connection to the Internet.

One solution to this problem would be to use a particular push client, which the user may not configure, or one that could only be configured partially, to ensure that the push server or servers concerned are not excluded from the list. Such a push client could still be tampered with by the user. A checksum or the like could of course be used to ensure that the appropriate push client was used, but still, the software would be found at the user's premises and the service provider would not be able to see if the appropriate push client was used.

The solution described in U.S. Pat No. 5,740,549 also enables the automatic supply of information for example to newspaper offices or emergency service centres requiring constant updating. It does, however, not suggest any way of monitoring the connection to see if the information is received as it ought to.

In both these cases there is a need to ensure that the information supplied from the push server actually reaches the client.

SUMMARY

This is an object of the present invention to provide a method and an apparatus that will increase the reliability of a data flow between a server and a client in a data communications network.

This object is achieved according to the invention by a method in a data communications network in which an application in a user terminal is arranged to receive information from a server in the network, comprising the following steps:

monitoring if a user who should have an active connection to the server is currently having such a connection;

if this is not the case, issuing a warning to the user and/or taking other appropriate action.

The object is also achieved according to the invention by a node in a data communications network, arranged to:

monitor if a user who should have an active connection to a server is currently having such a connection;

if this is not the case, issue a warning to the user or taking other appropriate action.

With this solution it may be ensured that everybody who should receive information from the server concerned really does. If not, an alarm may be issued, for example, to the originator of the information. This may be crucial, for example, in emergency service centre to which information is transmitted through a computer network.

In an exemplary embodiment, the user's connection to the data communications network is monitored. If connected to the data communications network, the user should also have an active connection to said server.

This ensures that a subscriber cannot be connected to the data communications network without also receiving information from the server or servers in question. For example, a subscriber cannot avoid receiving advertisements that he should receive according to his type of subscription.

If the user is connected to the data communications network without being connected to said server, the connection to the data communications network may be disconnected, or a warning may be issued, allowing the user to connect to the server. Of course, an alarm to be presented outside the system may also be issued, for example to the originator of the information.

The server may be any type of server transmitting data to a receiver, for example, a push server or a streaming server. Push servers were described above. Streaming servers are used for distributing, for example, voice and video signals to clients in a data network.

The information to be transmitted to each user, and/or the format to be used, may be selected in dependence of the user's profile, geographical location, type of terminal, etc.

The method and apparatus according to the invention function in any kind of data communications network, for example Internet Protocol (IP) networks, Asynchronous Transfer Mode (ATM) networks and frame relay networks.

DETAILED DESCRIPTION OF EMBODIMENT

Figure 1:
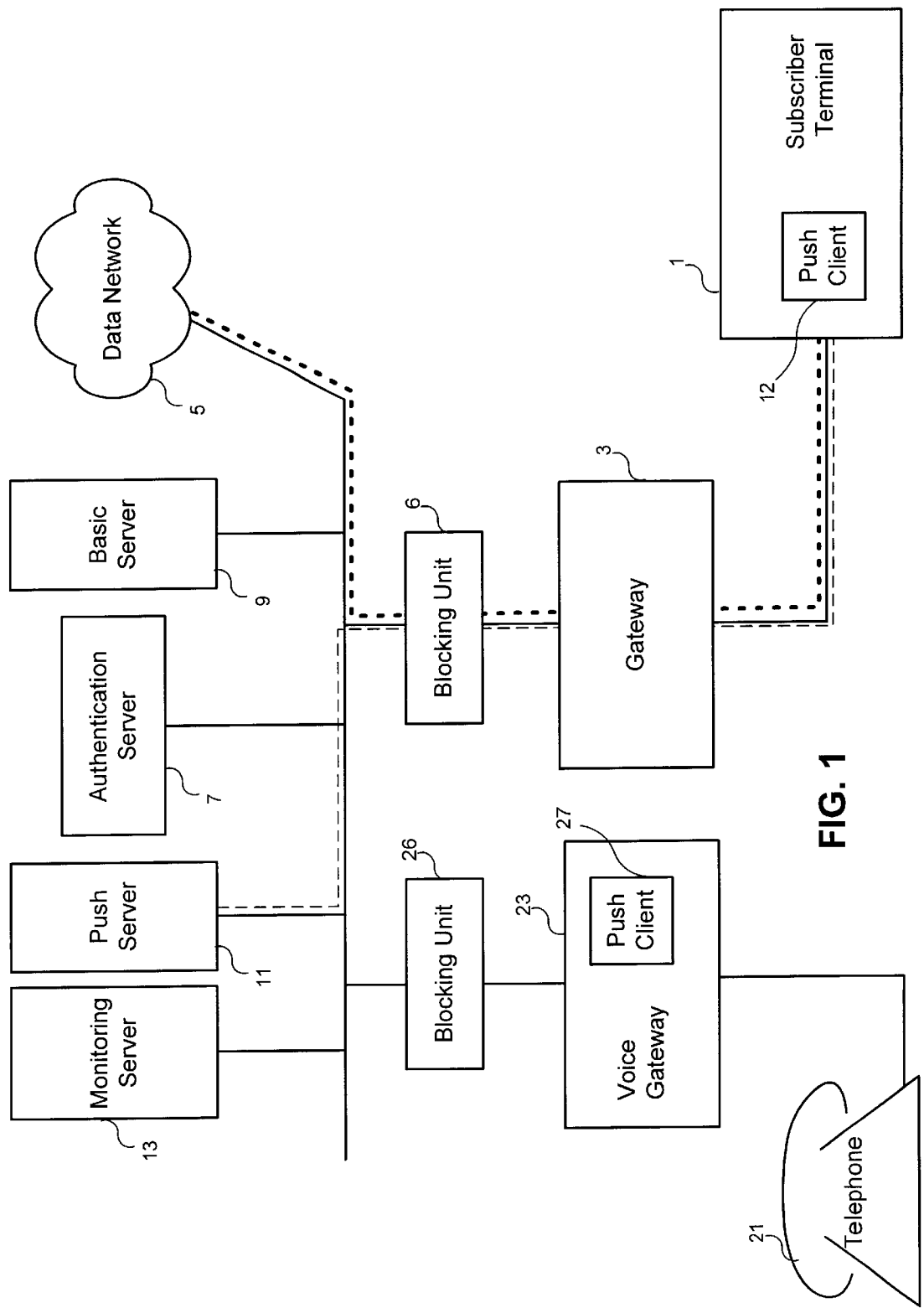
FIG. 1 shows an Internet configuration according to the invention.

FIG 1 shows a subscriber terminal 1, connected through a gateway 3 to a data network 5 in a way common in the art. It should be pointed out that the data network may be any kind of data network. It is, however, foreseen that the invention will be applied in Internet Protocol (IP) networks such as the Internet. Therefore, for simplicity, the term Internet is used in the discussion below.

The data network, or parts of the data networks may of course be according to other standards, such as the Asynchronous Transfer Mode (ATM) or frame relay standards.

Between the gateway 3 and the Internet 5 there may be a blocking unit 6 functioning to block the connection between the subscriber terminal 1 and the Internet 5 when ordered to do so. The blocking unit may be a router or a firewall, or any other solution that can perform this function. The functions of this blocking unit 6 may instead be included in the gateway 3.

The connection of the terminal 1 to the network may be through any kind of network used for the purpose, such as a telephone network, a cable TV network, an xDSL network, a LAN. The gateway 3 will differ depending on the type of network used. However, a prior art gateway adapted to the network type may be used in any case.

As common in the art, the Internet connection also comprises an authentication server 7 and a basic server 9. The authentication server 7 verifies the identity of the user and his right to be connected to the Internet and retrieve information. The basic server 9 is one or more servers performing the functions needed to connect to the various services of the Internet, such as the World Wide Web (WWW), e-mail service, File Transfer Protocol (FTP) service, Domain Name Server (DNS), etc. The functions of these two servers 7, 9 are well known in the art, and will therefore not be described here in more detail.

According to the invention a server 11 is included, which in this embodiment is a push server. The push server 11 typically comprises the advertisements to be transmitted to the user's terminal 1, in which there is a push client 12 enabled to receive the information from the push server 11.

The connection on which the user communicates with the Internet is shown in FIG. 1 as a dotted line. This communication may be concerning e-mail, WWW pages, or any other service offered through the Internet. While the user is connected to the Internet, the push server 11 will transmit information to the terminal 1 on a connection shown as a dashed line in FIG. 1.

To receive the information from the push server 11 the push client 12 must be configured to do so. For the present application this will probably be done by the vendor, typically the service provider. Most push clients, however, allow the user to specify the push servers from which information should be received. Therefore, the user could exclude the push server 11 from the list of push servers to avoid receiving the advertisements. The push client may be configured so that the user is not allowed to exclude certain push servers, but the user may still, possibly by some unauthorized action, exclude these push servers. To prevent this, according to the invention, a monitoring server 13 is used to ensure that the information from the push server is received by the terminal.

The monitoring server 13 retrieves information from the push server 11 and the authentication server 7 regarding the users currently registered with the two servers 7, 11. If a user who, according to his subscription, should be receiving advertisements while connected to the net, is registered with the authentication server 7 but not with the push server 11, this indicates that this user has disabled the transmission of advertisements while still connected to the Internet. According to one embodiment the monitoring server 13 then immediately orders the blocking unit 6 to block or disconnect the user's Internet connection. According to another embodiment the monitoring server 13 issues a warning to the user, advising him to reopen the connection to the push server 11 within a certain period of time to avoid being disconnected from the network.

The message from the monitoring server 13 to the blocking unit 6 telling it to disconnect or block a particular connection will take on different forms depending on the implementation of the blocking unit 6. As mentioned above, the gateway may in some cases perform the functions of the blocking unit so that no separate blocking unit is needed. Some gateways available today allow the disconnection of connections by a unit not involved in the connection, such as the monitoring server. In other gateways the connection may not be disconnected but may be blocked in the gateway by means of a software filter so that the terminal 1 will be effectively disconnected from the network 5.

The gateway 3 and the servers 7, 9, 11, 13 are all typically found at the Internet service provider's premises. The servers could, however, perform their functions 7, 9, 11, 13 from any location in the network 5.

It should be understood that the units shown in FIG. 1 as separate servers are intended to illustrate different functions performed in the network, rather than fix the number of units. Where feasible, functions shown as implemented in different units may well be implemented in one unit. Also, more than one server may be required to perform the functions attributed to one unit in the Figure. For example, any number of push servers may be used.

Other types of terminals, such as ordinary telephones, may be connected to the network. In FIG. 1 one such telephone 21 is shown, connected to the network through a voice gateway 23. A blocking unit 26 similar to the blocking unit 6 may also be used. Alternatively, the voice gateway 23 and the gateway 3 may be connected to the same blocking unit. The telephone is able to participate in IP telephony, in ways well known in the art. According to an embodiment of the invention, the IP telephony service may be offered for free if the participants to a call agree to receive advertisements for part of the duration of the call. Since the telephone 21 itself does not comprise a push client, the functions of a push client must be found in the network. FIG. 1 shows a push client 27 integrated with the voice gateway 23. The push client could, however, be a separate unit connected, for example, between the voice gateway 23 and the blocking unit 26.

The voice gateway 23, as is known in the art, converts the analogue or digital, circuit switched information received from the telephone to IP packages to be transmitted through the network. In the other direction, the voice gateway converts IP packages received from the network to analogue information to be transmitted to the telephone 21. This analogue information may comprise both speech received from another terminal in the network and information received from the push server, such as advertisements.

The principle of determining if a client should be receiving advertisements is generally the same as for the subscriber terminal 1. The push client informs the ISP that the subscriber is on-line or the ISP itself registers that the subscriber is on-line. If advertisements should be received and the system detects that for some reason they are not, the connection may be interrupted by the blocking unit. Alternatively, the subscriber could be instructed to enable the reception of advertisements to avoid interruption.

While the advertisements are sent, the connection between subscribers may be interrupted, or the advertisements may be added to the communication between the subscribers.

Figure 2:
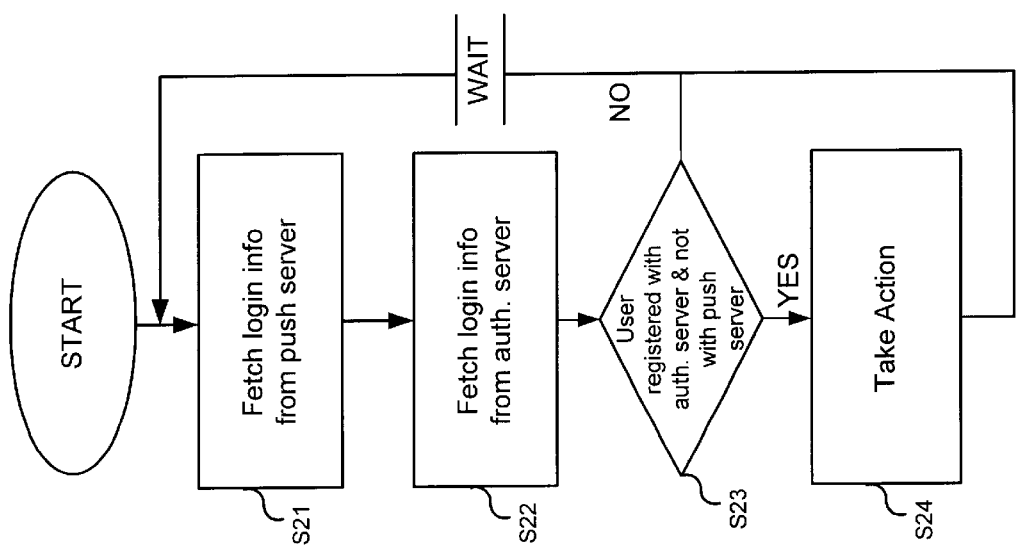
FIG. 2 is a flow chart of an embodiment of the method according to the invention.

FIG. 2 is a flow chart of an embodiment of the method according to the invention Step S21: The monitoring server retrieves information about the users registered with the push server;

Step S22: The monitoring server retrieves information about the users registered with the authentication server;

Step S23: Is any user registered with the authentication server but not with the push server? If yes, go to step S24, if no, wait a predetermined amount of time, then go to step S21.

Step S24: The monitoring service takes the appropriate action. The action may be to transmit a warning to the user or to disconnect the connection as discussed above. Wait, then return to step S21.

The solution according to the invention also enables the registration of advertising sent to each individual.

In order to make the service acceptable to the users, the amount of advertising information transmitted, and its form, should not be perceived by the users as too annoying. This requires the adaptation of the type and amount of advertising information, for example, in any one or a combination of the following ways:

a limit to the number of advertisements per time unit, a restriction to transmitting information only when no information is being retrieved by the user, and/or a limit to the size of each advertisement and restrictions to where it may be placed on the screen.

The information to be transmitted to each user, and/or the format to be used, may be selected in dependence of the user's profile, geographical location, type of terminal, etc.

The user may be required to specify a profile of such things as his age, particular fields of interest, the geographical areas that are of interest to him, and other parameters that may be used for selecting information that is to be transmitted to the user. The basic server 9, or another server, should then comprise functions for selecting messages to be transmitted to a user in dependence of the user's profile, and instruct the push server accordingly.

One of the units in the network, for example, the basic server 9, may comprise functions for registering the type of terminal the user is currently using to connect to the network, and for selecting the appropriate message format in dependence of the terminal type. The terminal type used at a particular location may also be registered in the network, or the terminal type may be obtained dynamically from the network. Alternatively, the type of terminal may be specified in the profile. For example, if the user is connected to the network using a simple telephone, he can only receive voice messages, and the messages must be transmitted in the appropriate circuit switched format. Typically, the messages will be stored in the push server 11 or similar unit in the network, in a digital format, and the conversion to the format that can be received by the terminal is performed in the gateway through which the terminal is connected. The push server 11 may therefore comprise several different sets of messages (or several push servers may be used for different sets of messages). The basic server 9, or another server in the network, then instructs the push server 11 to send the appropriate message in the appropriate format.

Also, the information may be selected in dependence of the physical location of the terminal, so that each user gets information relating to activities or offers near him. The user's position may be registered, for example by means of the Mobile Positioning System used in GSM. In this way, advertisers running local businesses will not have to pay for advertisements being transmitted to users who are outside their area, and the users will receive less information that is perceived as irrelevant.

In a more sophisticated embodiment, the movements of a terminal connected by a wireless connection may be registered, either to establish an activity pattern or to determine where the user is going. Messages may be selected accordingly. For example, if the terminal has been moving constantly for a long time, a reminder that the user should rest, could be transmitted, together with information about restaurants in the area.

In FIG. 1 only one Internet Service Provider (ISP) is shown. Usually, several ISPs will be present, each having gateways, basic servers, push servers, authorization servers, etc. Each ISP also has a customer database, comprising customer addresses, profiles etc. In order to reach a specific client, therefore, several customer databases may have to be searched. This may also be the case when one customer database has been divided on several units. To avoid this, a Directory Access Gateway (DAG), known in the art, may be used. A DAG uses an index object summary of the data. A query to the DAG concerning the address of a particular customer is referred by the index to the relevant directory server, that is, in this case, the customer database. When the desired address information has been retrieved, the directory access gateway informs the unit making the query about the ISP to which the user is connected. Alternatively, the gateway could return the address itself to the unit making the request, which would then establish the connection. The ISPs usually prefer the first solution, since the addresses and other information about their customers can then be kept secret.

In another embodiment the push server 11 is not used to distribute advertisements, but for other types of information. For example, important information may be conveyed to the fire brigade or the police, or to a newspaper editor. In this case, the monitoring server 13 will function mainly as described above, but the chief object of the monitoring will be to ensure that the connection from the push server 11 to the user is still working. In this embodiment, no connection to the data network 5 is needed, although it may of course be present. Also, no blocking unit 6 is needed in this embodiment, since no connection is to be blocked.

Figure 3:
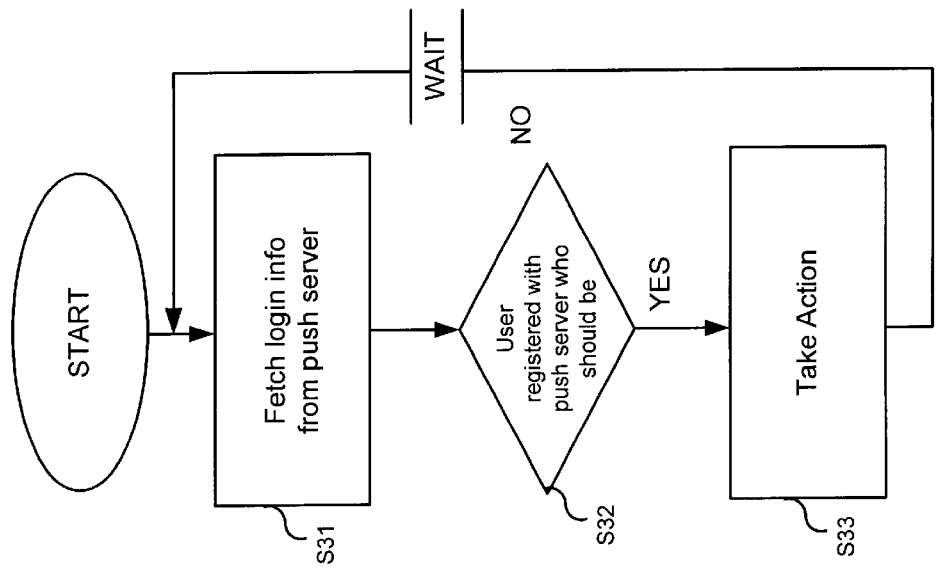
FIG. 3 is a flow chart of another embodiment of the method according to the invention.

FIG. 3 is a flow chart of this embodiment of the method according to the invention Step S31: The monitoring server retrieves information about the users registered to receive information from the server;

Step S32: Is any user that should be registered with the push server not registered? If yes, go to step S33, if no, wait a predetermined amount of time, then go to step S31.

Step S33: The monitoring service takes the appropriate action. The action may be, for example, to transmit a warning to the user, or an external alarm, or to disconnect the connection as discussed above. Wait, then return to step S31.

As explained above, in this embodiment the monitoring server may know that a user should be registered with the server simply by knowing that the user should always be registered, or always at a particular time of the day, or something similar. The server may, as before, be a push server, a streaming server or any other type of server providing information to one or more receivers. As when advertisements are involved, information may be selected in dependence of the geographical location, profile and/or other parameters.

What is claimed is:

1. A method in a data communications network in which an application in a user terminal is communicating with said data communications network and is arranged to receive advertisement information from a server in the network, comprising the following steps:

monitoring whether said user terminal is maintaining an active connection with said server while communicating with said data communications network wherein said server provides advertisement information to said application within said user terminal; and in response to a determination that the user terminal is not maintaining said connection with said server and not receiving said provided advertisement information, taking a predefined action within said data communications network.

2. A method according to claim 1, wherein said step of taking said predefined action comprises issuing an indication of said advertisement information not being received by said user terminal to said server.

3. A method according to claim 2, wherein, if the user is connected to the data communications network without being connected to said server, said data communications network issuing a warning message to said user terminal prior to terminating said communication.

4. A method according to claim 1, wherein the user's connection to the server should be active at certain times.

5. A method according to claim 1, wherein said predefined action includes terminating further communication between said user terminal and said data communications network.

6. A method according to claim 1, wherein said server is a push server or a streaming server.

7. A method according to claim 1, wherein data is transferred according to the Internet Protocol (IP).

8. A method according to claim 1, wherein data is transferred according to Asynchronous Transfer Mode (ATM) standards.

9. A method according to claim 1, wherein data is transferred according to frame relay standards.

10. A node in a data communications network in which an application in a user terminal is communicating with said data communications network and is arranged to receive information from a server in the network, comprising means for monitoring whether said user terminal is maintaining an active connection with said server while communicating with said data communications network wherein said server provides advertisement information to said application within said user terminal; and means, in response to a determination that said user terminal is not maintaining said connection with said server and not receiving said provided advertisement information, terminating further communication between said user terminal and said data communications network.

11. A node according to claim 10, further comprising means issuing an indication to said server indicating that said user terminal is not receiving said provided advertisement information and terminating said further communication in response to a determination that said server cannot re-establish a connection with said user terminal.

12. A node according to claim 10, further comprising means for issuing a warning message to said user terminal failing to maintain said active connection to said server.

13. A node according to claim 10, wherein said node is arranged for communication according to the Internet Protocol (IP).

14. A node according to claim 10, wherein said node is arranged for communication according to the Asynchronous Transfer Mode (ATM) standard.

15. A node according to claim 10, wherein said node is arranged for communication according to the frame relay standard.

16. A data communication system including a data network for communicating with a user terminal, comprising:

a blocking unit for allowing said user terminal to communicate with said data network;

a push server for storing and communicating advertisement data to said user terminal; and a monitoring server for monitoring whether said user terminal is receiving said advertisement data communicated by said push server while being connected to said data network and in response to a determination that said advertisement data are not being received by said user terminal, instructing said blocking unit to disallow said user terminal from communicating with said data network.

17. The data communication system of claim 16, wherein said monitoring server monitors said user terminal during certain time period.

18. The data communication system of claim 16, wherein said user terminal comprises a mobile unit and said monitoring server monitors said mobile unit when located within a certain geographic location.

19. The data communication system of claim 16 wherein said push server communicates certain advertisement data based on user profile associated with said user terminal.

20. The data communication system of claim 16 wherein said monitor server notifies said push server of said user terminal not receiving said advertisement data and instructing said blocking unit to disallow said communication in the event said push server cannot reestablish a connection with said user terminal for communicating said advertisement data.

21. A method according to claim 1 wherein said user terminal comprises a mobile device and said step of monitoring is performed when said user terminal is located within a particular service area.

22. A method according to claim 21 wherein said server provides advertisement information to said mobile device based on current location associated with said mobile station.

23. The node of claim 10 wherein said means for monitoring said user terminal is performed during certain time period.

* * * * *